Sept. 20, 1971       J. W. CHEN       3,605,166
FLOOR MAT CONSTRUCTION
Filed Feb. 20, 1969
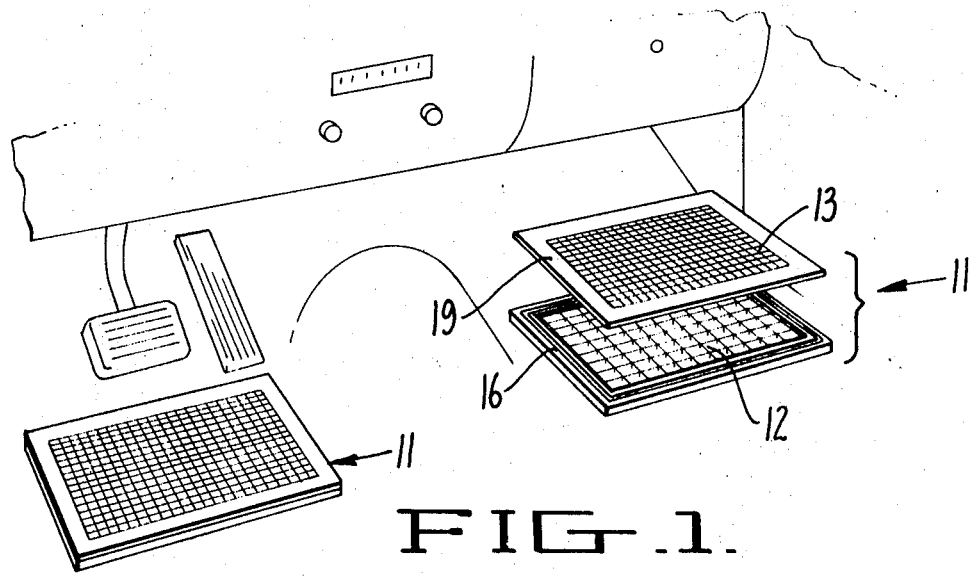
FIG. 1.
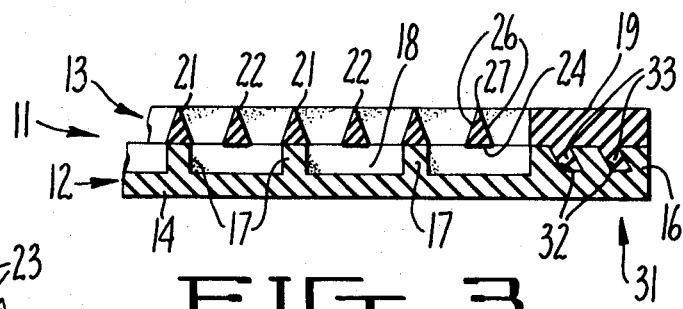
FIG. 3.
FIG. 4.
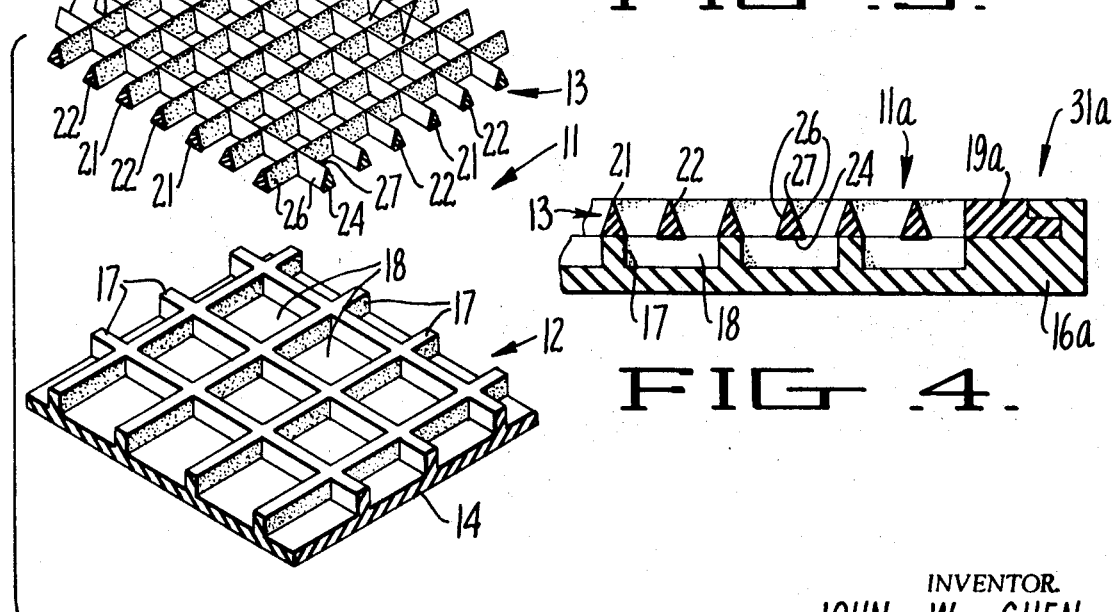
FIG. 2.
INVENTOR.
JOHN W. CHEN
BY
Schapp & Hatch
ATTORNEYS :::
United States Patent Office 3,605,166
Patented Sept. 20, 1971

3,605,166
FLOOR MAT CONSTRUCTION
John W. Chen, 1168 Broadway,
San Francisco, Calif. 94109
Filed Feb. 20, 1969, Ser. No. 801,117
Int. Cl. B62d 25/20
U.S. Cl. 15—215  7 Claims

ABSTRACT OF THE DISCLOSURE

A floor mat construction especially suitable for use in the interior of automobiles comprising a tray, a grate and fastening means for removably securing the grate in a desired position over the tray; the tray being formed with internal partitions defining a plurality of open-top compartments formed to hold mud, water and the like in a fixed area against splashing; a grating formed to fit over the tray and completely cover the partitions therein, with the grate being formed with tapered sides and terminating in knife-like upper edges; the whole mat construction preferably being formed of tough, light-weight resilient material such as rubber or rubber compositions, and with the grating providing a larger number of small openings than is provided by the compartments but preferably of the same shape.

BACKGROUND OF THE INVENTION

The present invention relates to a floor mat construction, and more particularly to a floor mat construction especially suitable for use in the interior of automobiles or other moving devices.

It is well known that the floor of an automobile and particularly the driver's side accumulates considerable mud and dirt during inclement weather, and it is also well known that accumulations are frequently large enough to become a serious nuisance to the driver. The problem may become particularly serious due to the transference of mud and the like onto the control pedals. Accordingly, it is desirable to provide a mat construction which will not only allow the driver to clean and dry his feet, but which will also be able to accommodate rather substantial amounts of mud and water. It is also desirable that such mat construction be easily cleaned each time it acquires a substantial accumulation of material so as to be maintained in good working order.

SUMMARY OF THE INVENTION

In accordance with the present invention, an improved mat construction is provided by a mat construction having two separable units in the form of a tray and grate together with means for fastening the tray and grate together in proper juxtaposed relation. The tray is formed with a plurality of compartments so as to provide a reservoir of mud and water, with the compartments sized to minimize sloshing and other movements of liquids normally occurring in traveling vehicles and the like. The grate is formed to completely overlie the partitions and walls of the tray so that all water and mud will fall or drain downward into the open top compartments of the tray. The grate is also constructed with tapered walls terminating in knife-like upper edges so that the user's feet may be properly wiped and the water and dirt removed therefrom will tend to pass down through the openings in the grate.

Preferably, the mat is constructed of tough resilient flexible material such as rubber or rubber having cording or other fibrous material associated therewith. The means for fastening the grate to the tray may be any suitable device, but preferably it is in the form of a recess and finger construction or tongue and groove construction molded in the rubber so as to secure the grate in flat juxtaposed position to the tray without need for fastening hardware. In addition, the grate is preferably formed with smaller openings between the members thereof and the opening in the top of each compartment.

Accordingly, it is a primary object of the present invention to provide improved mat construction especially suitable for automobiles which is capable of receiving large accumulations of mud and water, and retaining them in an out-of-the-way position until such time as the mat is cleaned.

Another object of the invention is to provide a mat construction of the character described which is easily cleaned and otherwise serviced.

A further object of the invention is to provide a mat construction of the character described which is especially suitable for use in automobiles or like vehicles where the mat is subjected to the erratic motion, and where relatively large deposits of mud and water might occur.

Further objects and advantages of the invention will be apparent as the specification progresses and the new and useful features of the mat construction will be more fully defined in the claims attached hereto.

BRIEF DESCRIPTION OF THE DRAWING

The preferred forms of the invention are illustrated in the accompanying drawing forming a part of this description, in which:

FIG. 1 shows an assembled mat construction in position in the interior of an automobile along with an exploded view of the mat construction in another location in the interior of the automobile;

FIG. 2, a fragmentary perspective view of the two component parts of the car mats shown in FIG. 1;

FIG. 3, a fragmentary, vertical, cross-sectional view of the car mat shown in FIGS. 1 and 2, illustrating a preferred form of fastening means; and FIG. 4, a cross-sectional view similar to that of FIG. 3, but showing a mat construction having an alternate form of fastening means.

While only the preferred forms of the invention are shown, it should be understood that various changes or modifications may be made within the scope of the claims attached hereto without departing from the spirit of the invention.

DETAILED DESCRIPTION OF THE PREFERRED EMBODIMENTS

Referring to the drawings in greater detail and particularly to FIG. 1, there is shown a general interior of an automobile having a pair of car mats 11 placed over the floor in the heavy traffic positions. As here shown, each mat is simply placed over the regular carpeting or base mat of the car, but it will be appreciated that the mat 11 could be secured to the carpet or floor covering of the car if desired. However, it is important that the mat 11 be easily removable from the car so that it may be cleaned.

Referring again to FIG. 1, it is seen that the mat comprises two sections, one being a tray 12 and the other being a grate 13. The tray 12 is formed with the bottom 14, border walls 16, and partition walls 17 so as to provide a plurality of open-top compartments 18.

The grate 13 comprises border members 19 adapted to fit over the border walls 16 of the tray, first grid members 21 adapted to fit over the partition walls 17 of the tray, and second grid members 22 adapted to extend between the grid members 21 and provide openings 23 in the grid which are generally smaller than the openings of compartments 18.

Preferably the tray and grate are both made of good quality rubber in order to provide a tough flexible unitary construction for each component which is easily cleaned.

Typical rubber fillers such as fibers or fabrics of nylon or the like may be used to strengthen the overall construction and particularly the grid members, if desired. Preferably, the grid members are also of a triangular cross-section having a bottom wall 24 and tapered sidewalls 26 terminating in a knife-like upper edge 27 so as to minimize top areas likely to catch dirt, and also to provide scrapping elements for cleaning the feet. It should be noted, that the bottom 24 of the first grid members 21 are sized to completely overlie and match the top surface of partition walls 17 so that these two surfaces do not catch dirt and the like and prevent its easy movement to the bottom of the open top compartments.

The tray and grid should be fastened together in order to secure the proper orientation, yet the fastening should be such to permit easy disassembly for cleaning. Accordingly, the mat 11 also comprises fastening means 31 typically shown in FIG. 3, which includes recesses 32 in the border wall 16 sized to receive fingers 33 in the border members 19. Of course these fastening elements could be reversed, i.e. the fingers 33 placed on border walls 16 and the recesses 32 being placed in border members 19; the important factor being to provide good disengageable fastening means.

FIG. 4 shows a mat construction 11a having an alternate fastening means 31a built into border wall 16a and border member 19a. Otherwise, the mat is similar to that shown in FIG. 3. As there shown, the fastening means 31a is simply a tongue and groove construction which provides accurate positioning of the grate with respect to the tray, yet allows for easy disassembly for cleaning purposes.

In both of the forms of fastening means shown, it should be noted that the fastening elements are molded integral with the tray and grate. This design has the advantage of minimized cost as well as avoiding areas of weakness that attachment of metal hardware inevitably causes.

While the compartments here shown are square, it will be appreciated that other shapes may be used such as rectangles or triangles. However, for better strength and economy of materials, it is preferred that the compartments be square or substantially all equilateral triangles, and that the grid members be of matching configuration and sized to provide four openings per compartment.

In order to use the mat of this invention, the mat is simply assembled in clean form and placed in the car as shown.

During inclement weather, such as where shoes or overshoes might pick up heavy mud, the driver will typically have a mat in position under his feet. He can scrape his feet on the knife edge-like members of the grate, and the dirt and water and the like will fall down into the compartments 18 where they will be out of the way. With the driver's feet thus cleaned, he is able to operate the pedals without making the pedals unduly dirty or wet, and thereby maintain the equipment in a safer condition than where mud and the like is not removed from the feet. Periodically, the driver will rest his feet over the mat area, but this will not put any mud back onto his feet, because the mud will be safely kept out of the way in the compartments of the tray. Similarly, sudden stopping or turning or the like will not cause an undue amount of material to splash out of the tray because of the compartmentalized tray acting in concert with the second grid members 22 partially closing the open top compartments. In this way, water and mud is held out of the way until the tray may be cleaned.

It will also be appreciated, that the tray is quite valuable where heavy snow and the like is encountered, the compartments being particularly adapted to receive snow in melted form and hold a substantial quantity. In such cases, the excess water is also easily removed.

While the mat construction of this invention is particularly suitable for moving vehicles and the like, and has been designed to overcome the problems accompanying unusual changes of motion, it will be appreciated that the mat construction also may be used in other locations to advantage.

From the foregoing description, it is seen that a mat construction especially suitable for use in automobiles or the like is provided, which is economical to make and convenient to use.

I claim:
1. A mat construction comprising
    an open-top tray having internal partitions defining a plurality of compartments,
    said internal partitions having flat upper surfaces, a grating formed to fit entirely over the open-top tray and the internal partitions thereof,
    said grating being formed with members having flat bottom surfaces matching the flat upper surfaces of the partitions and tapered sides terminating in knife-like upper edges, and
    fastening means for holding the grating in position on the tray.
2. A mat construction as defined in claim 1, in which the tray and grating are composed of tough lightweight resilient material.
3. A mat construction as defined in claim 2, in which the fastening means comprises connecting members formed on the tray and grate, said connecting members including recesses and flexible projections sized to fit said recesses.
4. A mat construction for the interior of automobiles and the like, comprising
    a tray having border walls and partition walls defining a plurality of open-top compartments,
    a grate having border members adapted to fit over the border walls of the tray,
    said grate having,
        first grid members adapted to overlie and cover the partition walls of the tray, and
        second grid members adapted to fit between said first grid members to provide openings in the grate smaller than the compartments of the tray, and
    fastening means on the border walls of the tray and on the first grid members of the grate for removably securing the grate to the tray.
5. A mat construction as defined in claim 4, in which the first grid members are formed to completely cover the partition walls of the tray, and in which the first and second grid members have tapered sides terminating in knife-like upper edges.
6. A mat construction as defined in claim 5, in which the open-top compartments have openings in the form of a regular polygon and the openings in the grate are also in the form of a regular polygon.
7. A mat construction as defined in claim 6, in which there are four openings in the grate overlying each compartment.

References Cited
UNITED STATES PATENTS

| | | | |
|---|---|---|---|
| 2,810,672 | 10/1957 | Taylor | 296—1FX |
| 3,050,329 | 8/1962 | Pagan | 15—238X |
| 3,087,752 | 4/1963 | Winchester | 15—215X |

FOREIGN PATENTS

| | | | |
|---|---|---|---|
| 18,382 | 1890 | Great Britain | 15—238 |

WALTER A. SCHEEL, Primary Examiner

L. G. MACHLIN, Assistant Examiner

U.S. Cl. X.R.
296—1; 180—90.6